United States Patent

Adler

[15] 3,706,924

[45] Dec. 19, 1972

[54] POWER SUPPLY FOR A STEPPING MOTOR

[72] Inventor: Jason A. Adler, Costa Mesa, Calif.

[73] Assignee: Royal Industries, Inc., Pasadena, Calif.

[22] Filed: Dec. 4, 1969

[21] Appl. No.: 882,035

[52] U.S. Cl..................................318/685, 318/254
[51] Int. Cl..........................................G05b 19/40
[58] Field of Search......318/138, 254, 685, 696, 439; 310/49

[56] References Cited

UNITED STATES PATENTS

| | | | |
|---|---|---|---|
| 3,297,927 | 1/1967 | Blakeslee et al.................318/138 |
| 3,327,191 | 6/1970 | Goto.................................318/696 |
| 3,381,193 | 4/1968 | Smith..............................310/49 X |
| 3,418,550 | 12/1968 | Kolatorowicz et al............318/254 X |
| 3,445,741 | 5/1969 | Gerber............................310/49 X |
| 3,461,365 | 8/1969 | Newland et al..................318/696 X |
| 3,355,646 | 11/1967 | Goto.................................318/685 |
| 3,437,899 | 4/1969 | Hirokawa..........................318/696 |
| 3,385,984 | 5/1968 | O'Regan...........................318/696 |
| 3,535,604 | 10/1970 | Madsen et al....................318/696 |

*Primary Examiner*—G. R. Simmons
*Attorney*—Christie, Parker & Hale

[57] ABSTRACT

A programmed power supply rectifies multi-phase A.C. power to produce signal polarity D.C. voltage and applies the D.C. voltage to the stator windings of a multi-phase motor in a predetermined sequence so as to develop a rotating magnetic field, and the motor responds thereto by rotating discrete mechanical increments in a step-by-step fashion. The stator windings are arranged in a star configuration having a neutral and each winding is energizable independently of the others. The power supply includes a triggerable rectifying element for each winding and a programmer which is responsive to an external source of signals for triggering the rectifying elements in the predetermined sequence.

3 Claims, 4 Drawing Figures

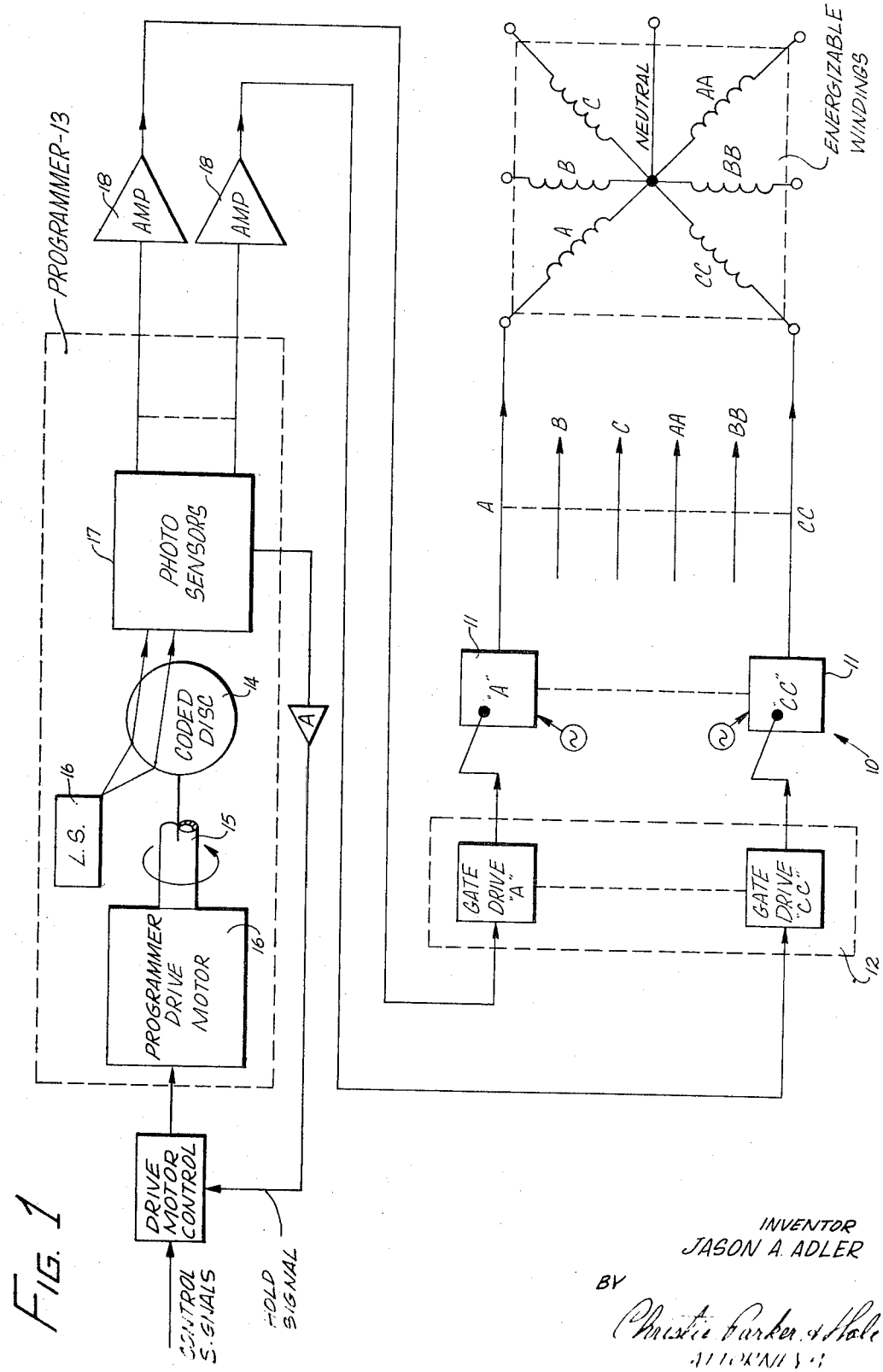

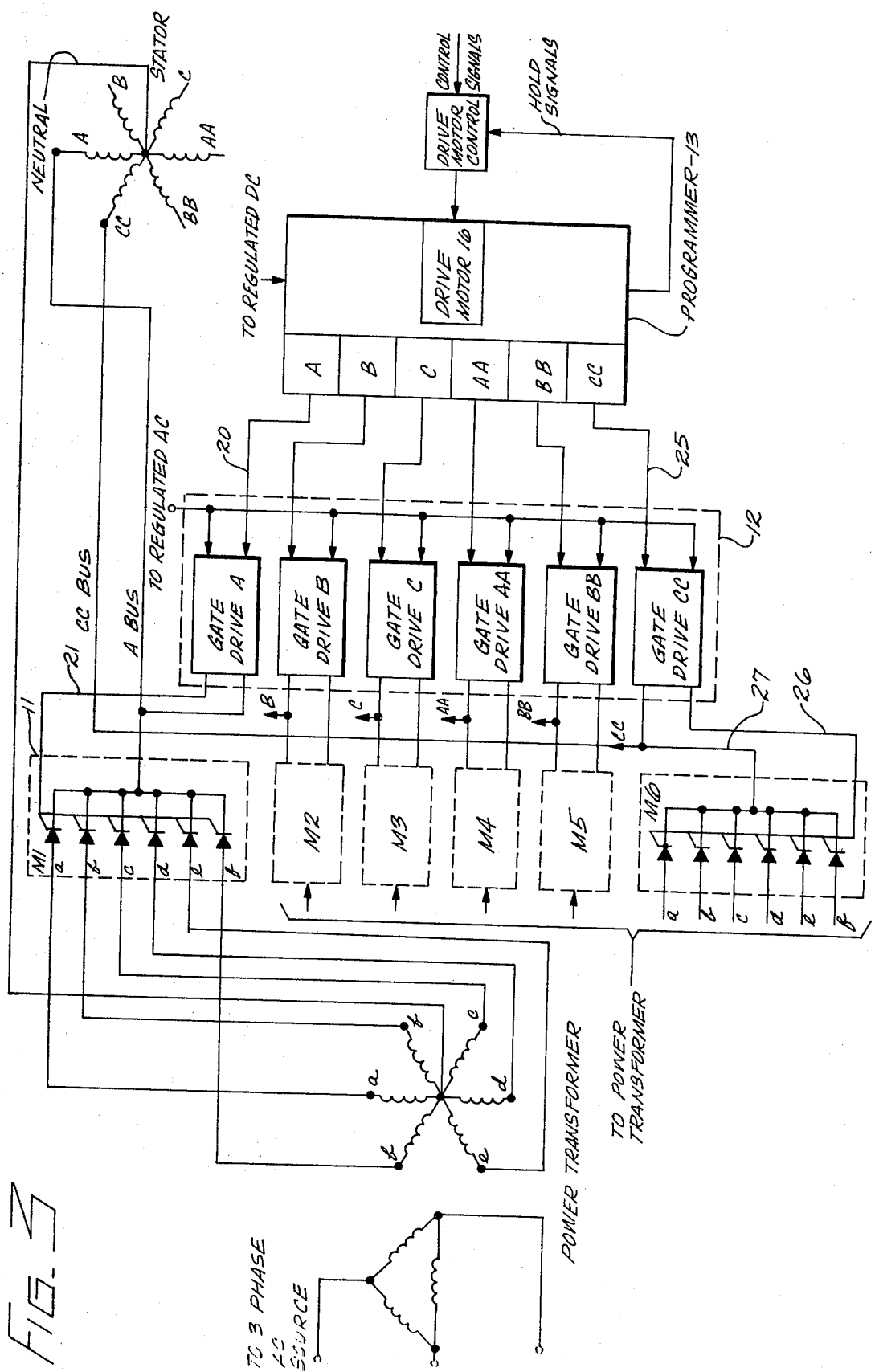

POWER SUPPLY FOR A STEPPING MOTOR

This invention relates to a power supply and in particular an electronic power supply particularly adapted for use with a control rod drive mechanism employed with a nuclear reactor.

In a control rod drive mechanism for a nuclear reactor it is generally desirable for positioning the control rod within the nuclear reactor vessel to generate a rotating magnetic field and then translate the resultant rotary mechanical motion to linear mechanical motion. Various types of electrical drive motors have been employed for this purpose. The power supplies that have been employed for this purpose can generally be classified as three-phase sinusoidal or electronic gating power supplies. The three-phase sinusoidal power supplies include rotating machines, such as amplidyne systems or commutator inverter, and the solid state cyclo-converter. The amplidyne system inheres all of the problems of rotating machinery in addition to being big and bulky. The commutator-inverter also inheres all of the disadvantages of rotating machinery. The cyclo-converter produces a direct current output of one to three cycles per second along with a 180 cycle ripple that causes vibrations in the control mechanism leading to excessive wear. The electronic power supplies have been designed with triggerable elements therein, such as silicon controlled rectifiers (SCR's). The problem associated with the prior art type of gated power supplies is that the SCR's are highly subject to misfiring and cause subsequent loss of control of the motion of the control rod. This type of power supply utilizes triggerable elements to energize the drive mechanism motor in a pre-set sequence. This system requires voltage pulses to energize the triggerable element and utilize the resulting change in voltage to deenergize another triggerable element, by use of a commutating capacitor. It has been found that external disturbances such as unwanted pulses generated by lightning, the plant switch gear or other sources can cause such prior art gated power supplies to misfire the triggerable circuits thereby rendering the associated control drive mechanisms unreliable.

The present invention provides an improved electronic gated power supply for the production of a rotating magnetic field and one that produces a rotating magnetic field having steps or increments of 15 mechanical degrees rather than 30° as in the prior art when employed with a four-pole motor. The present invention affords a triggerable power supply that is transient tolerant, has less vibration and is simpler than the three-phase sinusoidal or the gated power supply employing a capacitor for turning off the triggering element or SCR's. The present invention, furthermore, has been found to be reliably operative even though external disturbances such as those generated by lightning, plant switch gear and the like which render the prior art gated supplies unreliable. The reliability of the triggerable elements of the present invention is enhanced by employing alternating voltage to de-energize the elements.

The improved control over the rotating magnetic field is effected by sequencing the pulsing of the energizable windings of the drive motor in a 3-on, 2-on, 3-on, etc. sequence wherein three windings are energized momentarily, then one winding is de-energized and the other two remain energized, etc., so as to electrically step around the energizable windings until all of the windings have been energized in accordance with this logic. With this action the motor rotor coupled to the energizable windings for the motor will be stepped through the 15° increments. In the prior art power supplies, three coils, no more no less, have to be energized at any one time for reliable operation and an incremental step of 30 mechanical degrees is produced. It will also be noted that because of the 3—3 sequence of the prior art power supplies if more than three coils are energized the system may fail to operate.

From a method standpoint the present invention comprehends the production of a rotating magnetic field in a multi-phase winding including the steps of providing a direct current source for energizing each of the multi-phase windings and controlling the direct current source to cause the windings to be energized in a step-like fashion for producing the rotating magnetic field to effect mechanical increments of 15° in a four-pole reluctance motor, for example. The logic for effecting such a magnetic field is to control the energizable windings of the motor in a 3-on, 2-on, 3-on logic in rotating sequence for generating the rotating magnetic field.

From an apparatus standpoint, the power supply of the present invention is adapted for producing a rotating magnetic field in a motor having a stator and a rotor. The stator having a plurality of independently energizable windings employed for multi-phase operation. In one specific embodiment, the windings may be arranged in a star configuration for a four-pole, six-phase reluctance motor. A controllable direct current source is connected to each of said windings for independently energizing and de-energizing the windings in a preselected sequence for generating the rotating magnetic field in the stator to cause the rotor to respond thereto. Control means are connected to the direct current source for controlling the energization and deenergization of said windings in the 3-on, 2on or 3-on, etc., logical sequence while stepping around the star configuration in either a clockwise or a counterclockwise fashion depending upon the desired direction of rotation. The direct current source may comprise a plurality of triggerable elements such as the SCR's which are gated on by means of a programmer device for triggering them in accordance with the aforementioned logic. The SCR's are energizably controlled by a direct current triggering pulse and de-energized, by the alternating voltage applied to their anode electrodes, when the negative half cycle of the alternating voltage is applicable. The precise control of the rotating magnetic field and thereby any mechanism controlled thereby is effected through the provision of a programmer which sequentially controls the energization of the triggerable elements. The programmer may be any conventional type of programming device, electronic or electromechanical, and in the disclosed embodiment takes the form of an encoding element having a coded disc. The coded disc has a control pattern recorded thereon, and with the rotation of the encoder the pattern is sensed so that a series of signals are derived therefrom, in response to sensing the pattern on the disc, for triggering the SCR's in the desired sequence. When used in the nuclear reactor the drive of the encoder is synchronized with the control rod mechanism motion.

These and other features of the present invention may be more fully appreciated when considered in the light of the following specification and drawings, in which:

FIG. 1 is a schematic-wiring diagram of the power supply embodying the present invention;

FIG. 3 is a schematic wiring diagram of the power supply illustrated in FIG. 1.

Figure 2:
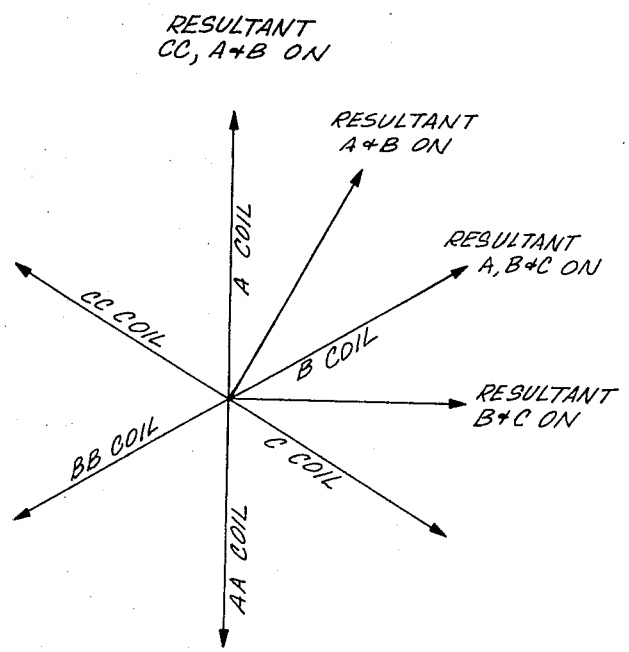
FIG. 2 is a vector diagram of the electrical relationship of the energizable windings of FIG. 1 illustrating the production of the rotating magnetic field.

Now referring to the drawings, the power supply of the present invention will be examined in more detail. The power supply of the present invention will be disclosed as it may be employed for energizing a four-pole, six-phase reluctance motor. It will be recognized by those skilled in the art that the reluctance motor is a more reliable type of drive motor but requiring a more complex power supply than similar drive motors. The power supply of the present invention, however, could be employed with a linear drive motor such as the "mag-jac" motor. For this purpose the stator of the drive motor is illustrated as arranged in a six-phase star configuration. The energizable windings of the stator reading in a clockwise rotation are identified by the reference characters A, B, C, AA, BB, and CC. The energizable windings are energized by direct current provided by the triggerable direct current source generally identified by the reference numeral 10. The windings are energized from the direct current sources in a sequential fashion, either in a clockwise or counterclockwise direction depending upon the desired direction of rotation for the motor rotor.

The direct current power source 10 includes a plurality of triggerable elements 11 that are gated to maintain them in conduction for a preselected interval and in accordance with the desired sequence for energizing the windings A through CC. The triggerable elements 11 may be conventional silicon controlled rectifiers (SCR's), having a control electrode connected to a gate of the elements 11. The gate drives 12 are connected to a programmer 13 that provides a series of control signals to the gate drives 12 that trigger the elements 11 in the correct sequence for generating the rotating magnetic field in the energizable windings. For this purpose the programmer 13 is illustrated in the form of an encoder having an optical coding disc providing the signals to the gate drives 12. With this type of programmer the sequential gating signals are generated by means of a coded disc 14 mounted to the rotating shaft 15 controlled from the program drive motor 16. The coded disc 14 has the desired pattern of control segments recorded thereon in terms of optical characteristics or light transmitting and opaque segments. The optical coded disc 14 is associated with a light source 16 for illuminating a section of the coded disc as it rotates thereby and directs the light signals through the light transmitting segments of the coded disc and onto the photosensor 17. With the impingement of the light signals onto the photosensors 17, the optical pattern of the disc 14 is reproduced as a corresponding pattern of electrical signals provided by the photosensors 17. The photosensors 17 are arranged with individual amplifiers 18 for each track recorded on the coded disc 14. The output of the amplifiers 18 are coupled to the gate drives 12.

Before examining the detailed operation of the power supply 10, the sequence of energizing the windings A through CC will be discussed. As mentioned hereinabove, the desired logic for energizing the star windings is to effect the rotating magnetic field for producing mechanical steps of 15°. For this purpose, the logic for sequentially energizing the windings is a 3-on, 2-on, 3-on, etc., logic. Assuming for the present that clockwise rotation is desired and that initially three windings are energized, namely, A, B and C, reference to the vector diagram of FIG. 2 will show the relative location of the vectors representative of the energization of windings A, B and C. The windings A, B and C are arranged apart 60 electrical degrees. When this electrical condition prevails, then, the resultant vector will overlie the vector for winding B and have a magnitude or length extending beyond the vector B, as illustrated. During the next succeeding interval, winding A is de-energized leaving only windings B and C energized. Since the windings B and C are electrically spaced apart by 60°, the resulting vector will lie between these two vectors and therefore will shift 30° from the position overlying vector B to the position illustrated in FIG. 2 displaced 30° between vectors B and C. During the next succeeding interval, windings B, C and AA are energized so that the resultant vector is again shifted a further 30°. This third resultant vector will overlie the vector C, as illustrated. This same shifting of the resultant vector will prevail as the windings are energized with the 3-on, 2-on logic, etc., thereby defining the rotating magnetic field. In the generation of such a rotating magnetic field in the four-pole, six-phase reluctance motor, the sequence of energization of the windings is effected in twelve electrical steps to effect the complete traversal of the windings from the assumed initial condition wherein the windings A, B and C are energized to the point where the three same windings are re-energized. In such a motor, this magnetic action produces steps of 15 mechanical degrees. Under these conditions, the energization of the windings in the twelve steps is illustrated in the Chart I below:

CHART I

| Steps | Windings | | | | | |
|---|---|---|---|---|---|---|
| 1 | A | B | C | | | |
| 2 | | B | C | | | |
| 3 | | B | C | AA | | |
| 4 | | | C | AA | | |
| 5 | | | C | AA | BB | |
| 6 | | | | AA | BB | |
| 7 | | | | AA | BB | CC |
| 8 | | | | | BB | CC |
| 9 | A | | | | BB | CC |
| 10 | A | | | | | CC |
| 11 | A | B | | | | CC |
| 12 | A | B | | | | |

At this point it should be noted that the programmer 13 will provide the necessary signals for actuating the triggerable elements 11 in the correct sequence to effect the energization and de-energization of the windings as noted in Chart I.

Figure 4:
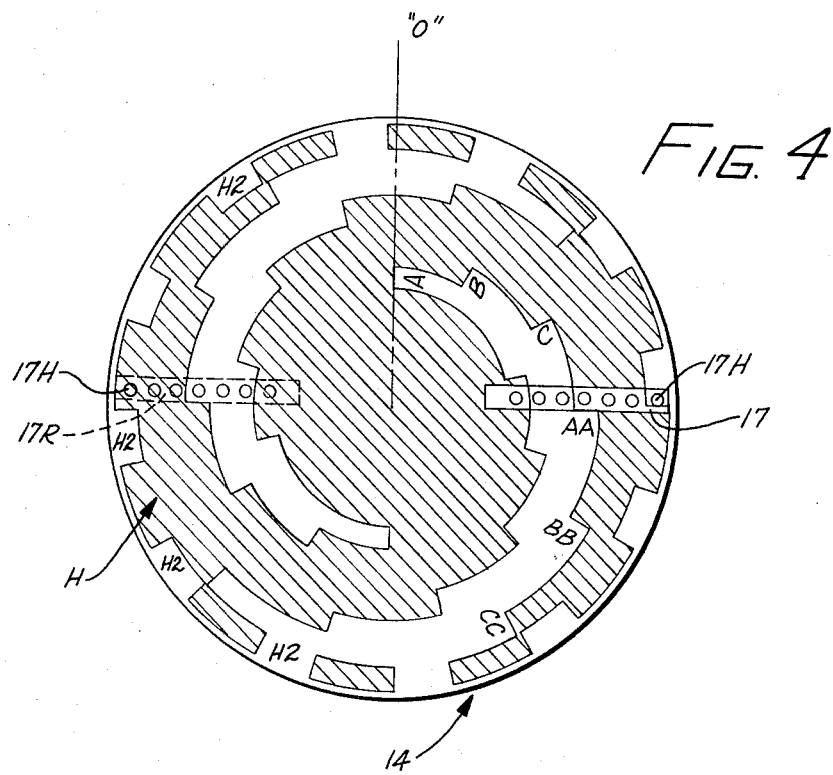
FIG. 4 is a plan view of the coded disc illustrated in FIG. 1.

When the programmer 13 is in the form of an encoder having a coded disc 14 with the light transmitting segments coded thereon for providing the desired electrical signals it may take the form of the pattern illustrated in FIG. 4. The coded disc 14 is illustrated in FIG. 4 as having six tracks that are identified as tracks A, B, C . . . CC to correspond with the identification of the energizable windings. The outer track illustrated in FIG. 4 is not employed for the present but will be described hereinafter. As will be appreciated from examining Chart I, each optical segment has an arc corresponding to five units of length and each track is displaced forwardly of the adjacent track two units in going from the innermost track or track A towards the outer periphery of the disc, or track CC. Stated differently, track A which may have its left hand edge defined coincident with the reference or "0" position of the encoding disc 14 extends a distance of five units in its individual track, while the adjoining segment is displaced two units from the "0" position and then extends from position "2" a distance of five units, while the pattern in track C is displaced two units from track B, etc. It will be noted that the pattern illustrated in FIG. 4 is symmetrical on each half of the disc 14 and may be employed for producing a second series of control segments as will be disclosed hereinafter. It should be noted that the photosensors 17 are diagrammatically positioned on the disc 14 in FIG. 4 for sensing the six tracks. For this purpose, the sensors 17 are arranged in radial alignment on the encoding element 14 for intercepting the light rays transmitted through the tracks and providing the corresponding electrical signals reproducing the pattern on the encoding disc 14 for effecting the desired triggering action on the triggerable elements 11.

Referring now to the outer track on the disc 14, the purpose of this track will be explained. The purpose of this outer track H is to place the control rod drive motors in the two windings energized condition whenever the drive motor is commanded to stop. For this purpose, this outer track is provided with segments H2 spaced apart on the disc and located to correspond to the segments when two coils are energized. This track is sensed by a sensor 17H to provide a hold control signal to control the program drive motor 16 to move the disc 14 to a position defined by the segments H2 to cause only two motor coils to be energized in the hold position; see FIG. 1. This results in a large power savings and heat reduction in the drive apparatus since at any one time a majority of drives are maintained in the hold condition. in applications where these factors are not important, the outer track function can be eliminated.

With the above description in mind, then, a detailed description of the operation of the circuits of FIG. 3 is in order. The signals generated from the programmer 13 will be assumed to be generated from the encoding disc 14 as the result of the actuation of the drive motor 16, a half revolution of the disc generating the complete cycle of the magnetic field. The signals will be derived from the programming means 13 for gating the elements 11 in the sequence of steps shown in Chart I. Initially, then, the gating signals are derived from the programmer 13 for driving gates A, B and C, etc. of the gate drives 12. The gate drives 12 comprise a plurality of individual gate drives identified by the letters A, B, etc. to correspond with the identified stator windings of the drive motor. The gate drives 12 are coupled to control the triggerable elements 11. The triggerable elements 11 for each phase of the drive motor are illustrated in FIG. 3 as comprising six triggerable elements or SCR's for each phase. Each group of six elements 11 are shown within a block, with the blocks identified M1, M2 . . . M6. The signals from the gating drives 12 are coupled to the gate electrode of each element 11 for controlling the time that the element is energized. Each anode electrode for each group of the elements 11 is connected to an alternating current source, as illustrated. The cathode electrodes are connected in parallel circuit relationship to an individual winding, such as the winding A, to provide the necessary energization of the windings. Each of the six cathode electrodes of the elements 11 that correspond to the same windings are connected in common for energizing the winding. Tracing a specific circuit from the programmer 13 it will be seen that the control signal from the programmer for winding A is applied to the gating drive A by means of the lead wire 20. The output from the gating drive A is applied by means of the lead wire 21 to each of the triggerable elements within the block M1. With the gating signal applied to the elements during the interval that the alternating current at each anode electrode is in the positive half-cycle, the corresponding element will conduct until the negative half-cycle is reached. With the conduction of these six elements the output currents therefrom may be combined into a bus similar to the one identified as the A bus directly connected to the A winding. In the same fashion the gating signals may be traced from the programmer 13 to the controllable elements 11 for each of the other windings. For example, the control segment from the programmer 13 for gate drive CC is applied thereto by means of the lead wire 25 and the output from the gate drive CC is coupled to the elements 11 by means of the lead wire 26. The lead wire 26 is connected to the gate electrode of each of the elements 11 that are further identified as the CC elements. As in the case of the A elements, the output currents are derived from the cathode electrodes of the CC elements that are connected in parallel by means of the lead wire 27 and to the CC bus which is connected to the CC winding of the drive motor. Each of the other segments may be similarly traced and are shown connected in their correct relationship to the triggerable elements for each phase M1 – M6 in FIG. 3. It should be recognized that the gating signals are only effective for triggering the elements 11 to a conductive condition and that with the alternating voltage applied to the anode electrode, in the negative one-half cycle, each triggered element will be rendered nonconductive until the anode voltage again becomes positive. This conducting condition exists as long as the triggering signal is received from the programming means 13.

It should now be evident that with the above structure in mind the rotating magnetic field is produced through the sequential energization of the windings A–CC in the 3-on, 2-on, etc., logic. Then the control signals are applied to the program drive motor 16, by means of the operator in the nuclear reactor application, the shaft 15 and the coded disc 14 are rotated.

With the sensing of the coded disc 14 the series of gating signals to effect the 3-on, 2-on logic is generated and applied to each of the gating drives A, B, C, etc., for triggering the six elements 11 of each phase to effect the energization of the windings A – CC in accordance with the twelve steps illustrated in Chart I in one half revolution of the encoding disc 14. A further advantage of the above logic may be realized when such a power supply is employed for energizing a reluctance motor utilized to control the control rod in a nuclear reactor. It will be appreciated that the control for such a reactor must be accurately controlled and the misfiring of the elements 11 must be minimized as well as the reliable energization maximized. For this purpose the present power supply lends itself to redundant operation since a similar power supply may be arranged in parallel circuit relationship with the power supply 10 for energizing the windings in a redundant fashion. For this purpose the programmer 13 may take the same form as the encoding element 14 due to the redundancy of the pattern employed on the encoding disc 14. A second bank of photosensors illustrated in FIG. 4 as the sensors 17R will be arranged on the second half of the encoding element for providing the same sequence of signals as in Chart I for controlling the second or auxiliary group of gate drives associated with the auxiliary bank of triggerable elements 11. The output signals of the auxiliary power supply are merely arranged in parallel circuit relationship with those of the primary supply 10 so that if there is a malfunction in the power supply 10 and not in the auxiliary power supply, the windings A through CC will be energized in the correct sequence. It should be recognized that the circuit of the present invention allows for redundant operation completely through to the motor windings. This type of redundancy, to the motor windings, is not possible with other known power supplies particularly for nuclear reactor control drives.

What is claimed is:

1. A power supply for producing a rotating magnetic field in a stepping motor stator comprising:

a stepping motor having a stator and a rotor, the stator having a plurality of independently energizable windings arranged in a star configuration with each winding connected to a neutral, a single polarity direct current source connectable for independently energizing each of said windings and operative when connected to a winding to supply current through the winding and the neutral, said source having an individual triggerable rectifying element for each of said windings, each of said triggerable elements comprising a plurality of groups of silicon controlled rectifiers each having first, second and third electrodes, the first electrodes of each individual group of rectifiers being connected in common for accepting a gating control signal for rendering the rectifiers conductive, the second electrodes of each group of rectifiers being independently connectable to an alternating current power source and the third electrodes of each group of rectifiers being connected in common to a corresponding winding for supplying the direct current to the winding upon conduction of the rectifier, a multi-phase alternating current source having each phase independently connected to one of the second electrodes in each group of rectifying elements, controllable means for independently supplying gating control signals to the first electrodes of each group of rectifying elements, and program means constructed and defined for controlling the controllable means to supply the gating control signals to the first electrodes within each rectifying element group in a preselected sequence in accordance with the selected program and independent of the position of the motor rotor so as to cause the energization and de-energization of the multi-phase windings in a step-by-step fashion and thereby to cause the generation of a rotating magnetic field for producing the rotation of the rotor in 15 mechanical degree increments, the application of a gating control signal to said first electrodes of each group of rectifying elements causing the conduction of said rectifying elements upon the substantially simultaneous occurrence of the positive half cycles of the alternating current voltage applied to said second electrodes of said rectifying elements from said alternating current source while the occurrence of the negative half cycles of the alternating current voltage applied to said second electrodes maintain the rectifying elements non-conductive and/or render the rectifying elements non-conductive, whereby any external disturbances causing a non-conductive element to be triggered to a conductive condition not in accordance with the selected program will be conductive only for the remaining duration of the positive half cycle of the alternating current.

2. The power supply as defined in claim 1 wherein the multi-phase windings are arranged in a six-phase star configuration and the controllable means responds to the program means to supply the gating control signals in a 3-2-3, etc. sequence.

3. A power supply as defined in claim 1 wherein the program means comprises a disc having a code pattern recorded thereon for effecting the desired energization of said rectifying elements in said sequence.

* * * * *

PO-1050
(5/69)

UNITED STATES PATENT OFFICE
CERTIFICATE OF CORRECTION

Patent No. 3,706,924      Dated December 19, 1972

Inventor(s) Jason A. Adler

It is certified that error appears in the above-identified patent and that said Letters Patent are hereby corrected as shown below:

Col. 2, line 39, reads "2on", should read --2-on--.

Col. 3, line 43, reads "gate of the elements 11.", and should read --gate drive 12 for providing a triggering signal to the gate electrode of the elements 11.--

Signed and sealed this 20th day of November 1973.

(SEAL)
Attest:

EDWARD M. FLETCHER, JR.
Attesting Officer

RENE D. TEGTMEYER
Acting Commissioner of Patents